United States Patent [19]

Case

[11] Patent Number: 4,990,586
[45] Date of Patent: Feb. 5, 1991

[54] POLYURETHANES OF IMPROVED CHARACTERISTICS BIOCOMPATIBLE UREA-MODIFIED POLYURETHANE FROM CASTOR OIL

[75] Inventor: Barton C. Case, Simi Valley, Calif.
[73] Assignee: Hexcel Corporation, Dublin, Calif.
[21] Appl. No.: 554,964
[22] Filed: Jul. 17, 1990

Related U.S. Application Data

[63] Continuation of Ser. No. 488,377, Feb. 28, 1990, abandoned, which is a continuation of Ser. No. 152,768, Feb. 5, 1988, abandoned.

[51] Int. Cl.$^5$ .................... C08G 18/10; C08G 18/36
[52] U.S. Cl. .................................. 528/64; 528/60; 528/61; 528/74.5
[58] Field of Search ............... 528/64, 60, 61, 74.5

[56] References Cited

U.S. PATENT DOCUMENTS

| | | | |
|---|---|---|---|
| 3,194,793 | 7/1965 | Kogon | 260/77.5 |
| 3,366,844 | 1/1968 | Hoeschele | 260/858 |
| 3,583,926 | 6/1971 | Zwolinski et al. | 528/74.5 |
| 3,769,381 | 10/1973 | Konig et al. | 264/41 |
| 3,923,926 | 12/1975 | Harada | 260/77.5 |
| 3,962,094 | 6/1976 | Davis | 210/321 R |
| 3,979,364 | 9/1976 | Rowton | 260/77.5 |
| 4,165,287 | 8/1979 | Goyne | 210/232 |
| 4,170,559 | 10/1979 | Kroplinski et al. | 210/321 A |
| 4,309,378 | 1/1982 | Ganster et al. | 264/311 |
| 4,324,867 | 4/1982 | Patton, Jr. et al. | 521/159 |
| 4,598,136 | 7/1986 | Wick | 528/74.5 |
| 4,636,531 | 1/1987 | Schmidt et al. | 521/163 |

FOREIGN PATENT DOCUMENTS 1412818 11/1975 United Kingdom .

OTHER PUBLICATIONS

Knaub et al., "Castor Oil as a Way to Fast-Cured Polyurethane Ureas", Eur. Polym. J., 22:633-635 (1986).
Fedotova, O. Ya, "Reactions of Aromatic Diamines with Diisocyanates", Vysokomol. Soedin., Ser. A, 9(6), 1352-1357, 1967.
Ballistreri, A., et al., "Mechanism of Thermal Degradation of Polyurethanes Investigated by Direct Pyrolysis in the Mass Spectrometer", J. Polym. Sci., Polym. Chem. Ed., 18(6), 1923-1931.

Primary Examiner—John Kight, III
Assistant Examiner—Dennis R. Daley
Attorney, Agent, or Firm—Townsend and Townsend

[57] ABSTRACT

A urea-modified polyurethane having excellent characteristics is prepared by the reaction between a polyisocyanate and a polyol in the presence of a diamine having the formula

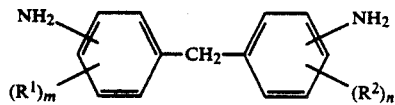

in which $R^1$ and $R^2$ are independently straight-chain $C_2$-$C_6$ alkyl, and m and n are independently either 1 or 2. The preferred polyol is castor oil, and in preferred methods the reaction is carried out by first forming a prepolymer of the polyisocyanate with the polyol, and then curing this with a solution of the diamine in a further amount of the polyol.

21 Claims, No Drawings

POLYURETHANES OF IMPROVED CHARACTERISTICS BIOCOMPATIBLE UREA-MODIFIED POLYURETHANE FROM CASTOR OIL

This is a continuation of application Ser. No. 07/488,377, filed Feb. 23, 1990, abandoned, now abandoned.

BACKGROUND OF THE INVENTION

The present invention is related to polyurethanes, and particularly to urea-modified polyurethanes.

The chemistry of urethane polymers extends over a very broad scope of chemical structures, producing products varying widely in properties and uses. A common variation from the basic urethane backbone structure (i.e., the carbamate linkage) is the incorporation of urea linkages, which is generally accomplished by the use of diamines as chain extenders.

Among the many uses of polyurethanes are those involving medical devices, where polyurethanes are used as structural materials for separatory devices and prosthetic devices, and also as adhesives in such devices. The polyurethanes assume a variety of forms, in these materials, including sheets, tubing, structural components, and two-component adhesive composition. In many cases, the polymer is in intimate contact with internal human tissue. In such applications, compatibility with the tissue is essential, and certain types of polyurethanes, notably those in which the polyol component is castor oil or various polyols similar in structure and properties, have been found to provide biocompatible products.

The various polyurethanes and their components have certain disadvantages which affect their utility, particularly in medical use. Biocompatibility, as mentioned above, is a problem in many cases. In addition, the product color is important, particularly when the product must be observed during use. This may occur for example when one is monitoring a clinical treatment process or a patient's progress, where a high degree of clarity and transparency is desired. In two-component polyurethane systems, the stability of each of the components and possible dangers to those handling them (such as toxicity considerations, particularly carcogenicity) are a concern. Still further, certain combinations of diamines and polyols have a strong tendency to react with each other, thereby interfering with the formation of the carbamate groups in the basic polyurethane curing reaction, which not only interferes with the polyurethane formation but results in a loss of the chain-extending function of the diamine.

SUMMARY OF THE INVENTION

It has now been discovered that a narrowly defined class of diamines has unique qualities when used as chain extenders or modifiers in the formation of urea-modified polyurethanes. These diamines are nontoxic, highly stable, and avoid interfering reactions with polyols, particularly those such as castor oil and its analogs, which have been found to be particularly biocompatible. These diamines thus produce an exceptional polyurethane product.

DETAILED DESCRIPTION OF THE INVENTION AND PREFERRED EMBODIMENTS

The critical diamines in accordance with the present invention are those having the formula

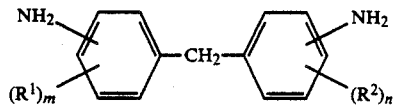

In this formula, $R^1$ and $R^2$ are either the same or different, and each is a straight-chain alkyl group of two to six carbon atoms. In preferred embodiments, $R^1$ and $R^2$ each contain two to four carbon atoms, with ethyl and n-propyl particularly preferred. The symbols m and n are either the same or different and denote integers which may be either 1 or 2. In preferred embodiments, m and n are both 1. In further preferred embodiments, the diamine is symmetrical, the amino groups are located at the 4-positions on the phenyl rings, and the alkyl substituents are located at the 3-positions, or the 3- and 5-positions (in the case of either or both of m and n being 2). Examples of diamines within the scope of the invention are:

Di(2-ethyl-4-aminophenyl)methane
Di(2-n-propyl-4-aminophenyl)methane
Di(3-ethyl-4-aminophenyl)methane
Di(3-n-propyl-4-aminophenyl)methane
Di(3-n-butyl-4-aminophenyl)methane
Di(3-n-hexyl-4-aminophenyl)methane
Di(3-amino-4-ethylphenyl)methane
Di(3-amino-4-n-propylphenyl)methane
Di(3,5-diethyl-4-aminophenyl)methane
Di(3,5-di-n-propyl-4-aminophenyl)methane
Di(2,6-diethyl-4-aminophenyl)methane Further examples are asymmetrical analogs of the above, involving various combinations of the substituted-phenyl groups.

Using these diamines, polyurethanes may be prepared in accordance with the present invention by any conventional technique, including both one-shot and two-shot methods. One-shot methods may be performed using polyurethane catalysts known to those skilled in the art. Examples include triethylene diamine and various organotin compounds such as di-n-butyl tin diacetate. Two-shot methods are likewise performed using conventional techniques. In general, the two-shot or two-package polyurethanes are prepared by first reacting a portion of the polyol with an excess of the polyisocyanate to form an isocyanate-terminated prepolymer (component A of the system). The prepolymer is then reacted with the remainder of the polyol, which is in the form of a solution containing a diamine within the scope of the above formula (component B).

The parameters of a two-package system may vary widely in value. In most cases, however, prepolymers with an isocyanate content of about 5 to about 30%, preferably about 10% to about 20%, will provide the best results. Likewise, a diamine content of component B ranging from about 0.5% to about 20%, preferably about 1% to about 10% (by weight) will provide the best results.

Relative amounts of components A and B used in forming the finished product may also vary. Preferred proportions will generally fall within the range of about 40% to about 60% by weight for each component. Particularly preferred proportions will be about 40% to about 50% by weight of component A. with the remainder being component B. The optimum levels and proportions in each case will vary with the desired properties and intended use of the finished product.

The reaction to form the polyurethane product may be conducted under conventional operating conditions. In the two-shot method, the components may be mixed at room temperature in the preselected proportions, particularly when the desired product is an adhesive. The product is then permitted to stand at room temperature, and will generally cure within about 5-10 hours. The two components may be prepared in advance, and sold shipped and stored as such, leaving the final polyurethane reaction to the user.

Polyisocyanates useful in the present invention are preferably diisocyanates. A wide range of diisocyanates may be used, including aromatic diisocyanates, aliphatic diisocyanates, cycloaliphatic diisocyanates, and blends of aromatic and aliphatic diisocyanates. Aromatic diisocyanates are preferred. Examples of diisocyanates are as follows:
ethylene diisocyanate
propylene diisocyanate
trimethylene diisocyanate
hexamethylene diisocyanate
cyclopentylene-1.3-diisocyanate
cyclohexylene-1.3-diisocyanate
cyclohexylene-1,4-diisocyanate
1,4-di(isocyanatomethyl)cyclohexane
1,3-di(isocyanatomethyl)cyclohexane
m-phenylene diisocyanate
p-phenylene diisocyanate
2,4-toluene diisocyanate
2,6-toluene diisocyanate
4,4'-methylenebis-(phenyl isocyanate)
3,3'-methylenebis-(phenyl isocyanate)
dibenzyl-4,4'-diisocyanate
1,4-naphthalene diisocyanate
1,5 naphthalene diisocyanate polymeric methylenebis(-phenyl isocyanates), such as those obtained by the phosgenation of aniline-formaldehyde-derived polyamines
3,3'-bitolylene 6,6'-diisocyanate isophorone diisocyanate 4,4'-methylenebis(cyclohexyl diisocyanate) 1,6-diisocyanato-2,2,4,4-tetramethylhexane 1,6-diisocyanato-2,2,4-trimethylhexane Preferred polyols for use in the present invention are mono-, di- and triglycerides of aliphatic carboxylic acids of 10 carbon atoms or more, particularly triglycerides of hydroxy-substituted aliphatic carboxylic acids. Notable examples are natural oils, particularly castor oil. A typical composition of castor oil is a combination of triglycerides glycerides of the following fatty acids:

| | |
|---|---|
| ricinoleic (cis-12-hydroxyoctadec-9-enoic) acid. | 87 |
| oleic (cis-9-octadecenoic) acid | 7 |
| linoleic ((Z,Z)-9,12-octadecadienoic) acid, | 3 |
| palmitic (n-hexadecanoic) acid | 2 |
| stearic (n-octadecanoic) acid | 1 |
| dihydroxystearic acids | trace amounts |

The following example is offered for purposes of illustration, and is intended neither to limit nor define the invention in any manner.

EXAMPLE

This example compares various diamines within the scope of the present invention to those outside the scope of the present invention, in terms of stability, toxicity, and reactivity in forming the polyurethane. Those within the scope of the invention are the first two entries, MBOEA and MDPA. As the data in the table demonstrates, these two species are superior in overall properties to all others tested.

TEST RESULTS ON TWO-PART URETHANES

Part A (Polyisocyanate Prepolymer; all parts by weight):
MDI, 54.4 parts
Castor oil. 30.6 parts
Isonate 143-L, 15.0 parts
Part B (Polyol Component): various diamines in castor oil, as listed below
Proportion: 47 parts of Part A to 53 parts of Part B

| | Polyol Component | | | Product | |
|---|---|---|---|---|---|
| Diamine | Weight % in Castor Oil | 1-Year Stability | Published Toxicity | Thixotropic Index | Color Index |
| Diphenylmethane Diamines: | | | | | |
| MBOEA | 2.0 | stable | non-toxic | 5.0 | 3 |
| MDPA | 2.0 | stable | non-toxic | 5.0 | 2 |
| MDIPA | 2 0 | stable | non-toxic | 4.0 | 3 |
| MBPMA | 2.0 | stable | non-toxic | 1.0 | 3 |
| MOCA | 2.0 | stable | toxic | 5.0 | 3 |
| MBMA | 2.0 | stable | non-toxic | 1.0 | 3 |
| MDA | 2.0 | stable | toxic | 5.2 | 3 |
| Phenylene Diamines: | | | | | |
| MPDA | 2.0 | stable | toxic* | 5.2 | 1 |
| DETDA | [ 2.0 4.0 ] | stable | non-toxic | [ 3.6 5.1 ] | [ 3 3 ] |
| ETHACURE 300 | 2.0 | stable | non-toxic | 1.6 | 3 |
| Saturated Linear Diamines: | | | | | |
| JEFFAMINE D-230 | 2.0 | unstable | non-toxic | 1.7 | 3 |
| JEFFAMINE D-2000 | 2.0 | unstable | non-toxic | 1.5 | 3 |

Key:
1-Year Stability: Sample is stored for 6 weeks at

TEST RESULTS ON TWO-PART URETHANES -continued

140° F. (equivalent to 1 year at room temperature), then mixed with polyisocyanate component; "stable": mixture thickens, indicating occurrence of curing: "unstable": mixture does not thicken, indicating that a reaction between the diamine and the castor oil has occurred during storage.
Thixotropic Index: Ratio of Brookfield viscosities (measured at 25° F.) at low shear (3 rpm) to high shear (30 rpm), taken immediately after polyol and polyisocyanate components are combined.
Color Index (determined by visual observation after complete cure):

3: straw-colored (i.e., excellent)
2: medium brown (i.e., good)
1: dark brown/black (i.e., poor)

Abbreviations and Trade Names:

| | |
|---|---|
| MDI: | 4,4'-methylenebis(phenyl isocyanate) |
| Isonate 143-L: | a carbodiimide-modified MDI product, obtained from Upjohn Polymer Chemicals, LaPorte, Texas, and also available from Dow Chemical Co., Midland, Michigan |
| MBOEA: | Di(3-ethyl-4-aminophenyl)methane ["methylenebis(o-ethylaniline)"] |
| MDPA: | Di(3,5-di-n-propyl-4-aminophenyl)methane ["methylenebis(di-n-propylaniline)"] |
| MDIPA: | Di(3,5-diisopropyl-4-aminophenyl)methane ["methylenebis(diisopropylaniline)"] |
| MBPMA: | Di(3-propyl-5-methyl-4-aminophenyl)methane ["methylenebis(propylmethylaniline)"] |
| MOCA: | Di(3-chloro-4-aminophenyl)methane ["methylenebis(o-chloroaniline)"] |
| MBMA: | Di(3-carbomethoxy-4-aminophenyl)methane ["methylenebis(methyl anthranilate)"] |
| MDA: | Di(4-aminophenyl)methane ["methylene dianiline"] |
| MPDA: | m-Phenylene Diamine |
| DETDA: | 3,5-Diethyl-2,4-diaminotoluene ["diethyltoluene diamine"] |
| ETHACURE 300: | 3,5-Dimethylthio-2,6-diaminotoluene, Ethyl Corporation, Baton Rouge, Louisiana |
| JEFFAMINE D-230 and D-2000: | polyoxypropylene diamines, molecular weights approximately 230 and 2000, respectively, Texaco Chemical Co., White Plains, New York. |

*MPDA discolors tissue.

The foregoing is offered primarily for purposes of illustration. It will be readily apparent to those skilled in the art that variations, modifications and further substitutions of the elements and features of molecular structure, system parameters and operating conditions described above may be made without departing from the spirit and scope of the invention.

What is claimed is:

1. A method for the preparation of a non-foamed biocompatible urea-modified polyurethane, said method comprising reacting a polyisocyanate with castor oil in the presence of di(3-ethyl-4-aminophenyl)methane said di(3-ethyl-4-aminophenyl)methane being the sole diamine present.

2. A method for the preparation of a non-foamed biocompatible urea-modified polyurethane, said method comprising reacting (a) a prepolymer prepared by a reaction between a polyisocyanate and castor oil with (b) a castor oil mixture comprising di(3-ethyl-4-aminophenyl)methane dissolved in castor oil, said di(3-ethyl-4-aminophenyl)methane being the sole diamine present.

3. A method in accordance with claim 2 in which said prepolymer has an isocyanate content of about 5% to about 30%.

4. A method in accordance with claim 2 in which said prepolymer has an isocyanate content of about 10% to about 20%.

5. A method in accordance with claim 2 in which said di-(3-ethyl-4-aminophenyl)methane comprises about 0.5% to about 20% of said castor oil mixture.

6. A method in accordance with claim 2 in which said di(3-ethyl-4-aminophenyl)methane comprises about 1% to about 10% of said castor oil mixture.

7. A method in accordance with claims 1 or 2 in which said polyisocyanate is a diisocyanate.

8. A method in accordance with claims 1 or 2 in which said polyisocyanate is a member selected from the group consisting of aromatic diisocyanates, aliphatic diisocyanates, cycloaliphatic diisocyanates, and blends of aromatic and aliphatic diisocyanates.

9. A method in accordance with claims 1 or 2 in which said polyisocyanate is an aromatic diisocyanate.

10. A method in accordance with claims 1 or in which said polyisocyanate is a member selected from the group consisting of methylenebis-(phenyl isocyanates), poly(methylebebis-(phenyl isocyanates)], toluene diisocyanates, and anphthalene diisocyanates.

11. A method in accordance with claims 1 or 2 in which said polyisocyanate is a methylenebis-(phenyl isocyanate).

12. A method in accordance with claims 1 or 2 in which said diisocyanate is 4,4'-methylenebis-(phenyl isocyanate).

13. A non-foamed biocompatible urea-modified polyurethane comprising the reaction product of a polyisocyanate, castor oil, and di(3-ethyl-4-aminophenyl)methane, said di(3-ethyl-4-aminophenyl)methane being the sole diamine present.

14. A non-foamed biocompatible urea-modified polyurethane comprising the reaction product of (a) a prepolymer prepared by a reaction between a polyisocyanate and castor oil, and (b) a castor oil mixture comprising di(3-ethyl-4-aminophenyl)methane dissolved in said castor oil polyol, said di(3-ethyl-4-aminophenyl)methane being the sole diamine present.

15. A urea-modified polyurethane in accordance with claim 14 in which said prepolymer has an isocyanate content of about 5% to about 30%.

16. A urea-modified polyurethane in accordance with claim 14 in which said prepolymer has an isocyanate content of about 10% to about 20%.

17. A urea-modified polyurethane in accordance with claim 14 in which said di(3-ethyl-4-aminophenyl)methane comprises about 0.5% to about 20% of said castor oil mixture.

18. A urea-modified polyurethane in accordance with claim 14 in which said di(3-ethyl-4-aminophenyl)methane comprises about 1% to about 10% of said castor oil mixture.

19. A urea-modified polyurethane in accordance with claims 13 or 14 in which said polyisocyanate is a diisocyanate.

20. A urea-modified polyurethane in accordance with claims 13 or 14 in which said polyisocyanate is an aromatic diisocyanate.

21. A urea-modified polyurethane in accordance with claims 13 or 14 in which said polyisocyanate is a methylenebis-(phenyl isocyanate).

* * * * *